June 10, 1930.  C. M. MANLY  1,762,723

PROCESS AND MEANS FOR MAKING TIRES

Filed Aug. 30, 1923  3 Sheets-Sheet 1

INVENTOR
Charles M. Manly
BY
Geo. Scherr
ATTORNEY

June 10, 1930.  C. M. MANLY  1,762,723
PROCESS AND MEANS FOR MAKING TIRES
Filed Aug. 30, 1923   3 Sheets-Sheet 3

INVENTOR
Charles M. Manly
BY
E. W. Scherr Jr.
ATTORNEY

Patented June 10, 1930

1,762,723

UNITED STATES PATENT OFFICE

CHARLES M. MANLY, OF RICHMOND HILL, NEW YORK; JOHN M. MANLY, WILLIAM G. MANLY, AND BASIL M. MANLY, EXECUTORS OF SAID CHARLES M. MANLY, DECEASED, ASSIGNORS TO OVERMAN CUSHION TIRE COMPANY, INC., OF NEW YORK, N. Y., A CORPORATION OF NEW YORK

PROCESS AND MEANS FOR MAKING TIRES

Application filed August 30, 1923. Serial No. 660,192.

Figure 1:
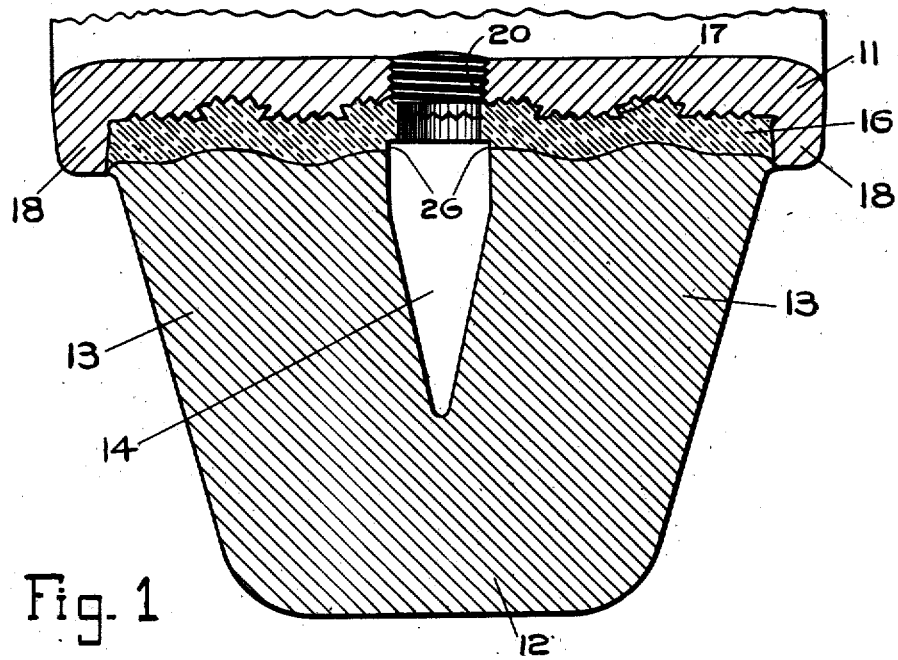

My present invention relates to an improved process and improved means for making vehicle tires containing closed or substantially closed cavities such, for instance, as the tire illustrated in Figure 1 of the annexed drawings.

The essential differences between the process and means for making vehicle tires embodied in this present application, and the process and means embodied in my application Serial No. 621,784 filed Feb. 28th, 1923, arise through the fact that the former application incorporated the use, for forming the cavities in the tires, of cores that were readily fusible for enabling them to be removed in a molten condition, whereas my present improvements incorporate the use of cores that are disintegrable and removable by a fluid disintegrating agent and preferably by dissolving, or softening by partial solution, either the entire core or merely the binding material that holds together less readily soluble or insoluble material. This invention is particularly applicable to tires of the type in which an annular body of rubber compound, provided with one or more internal circumferentially extending cavities or hollows, is vulcanized to a metal base band, but it is to be understood that it is also applicable to tires of other types, as well as to articles of manufacture other than tires. While therefore I have shown and will hereinafter describe preferred forms for carrying my invention into effect, yet I do not limit myself to such preferred forms.

Figure 2:
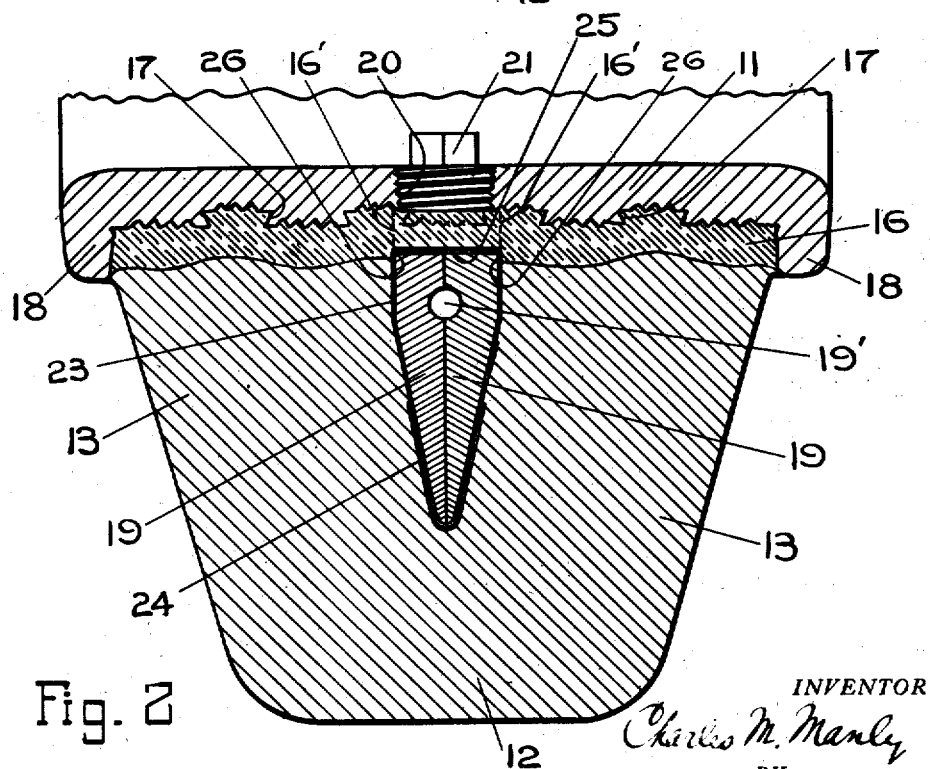
Figure 3:
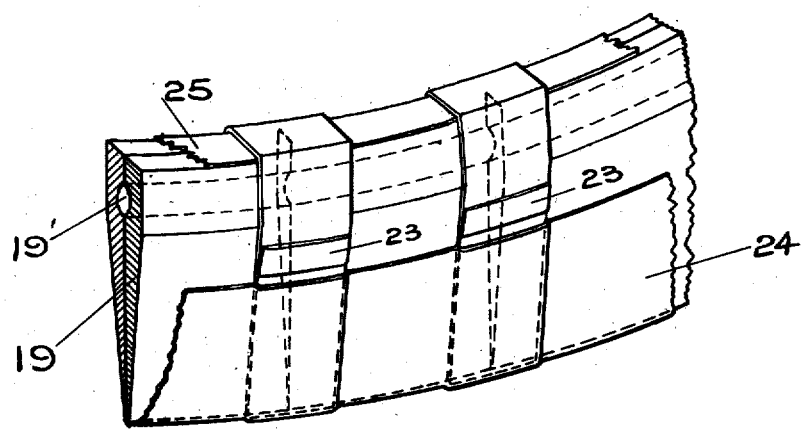
Figure 7:
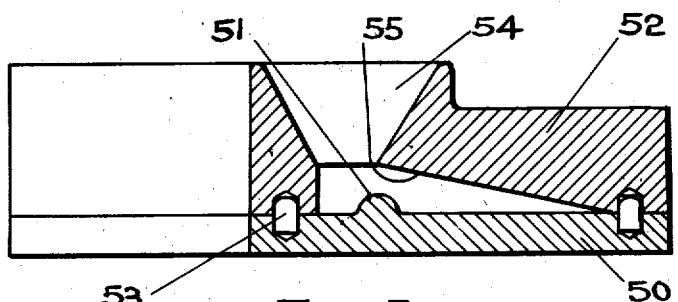
Figure 8:
Figure 4:
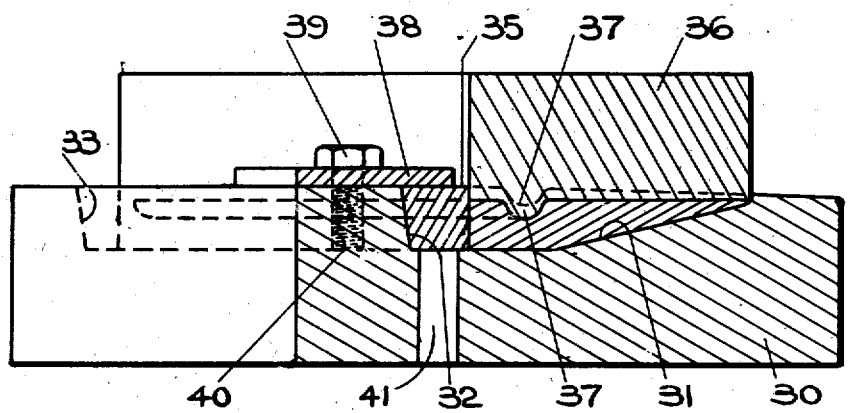
Figure 5:
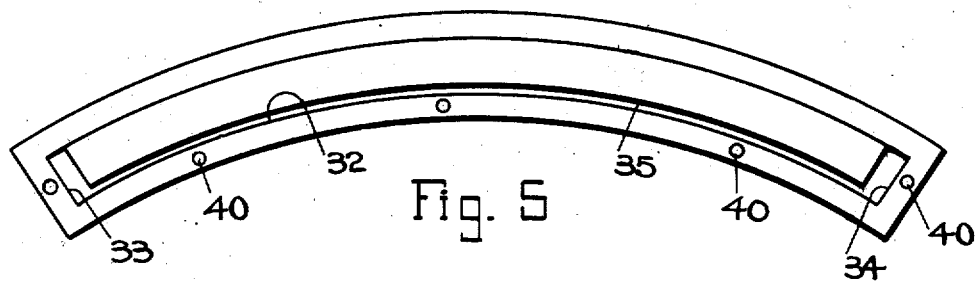
Figure 6:
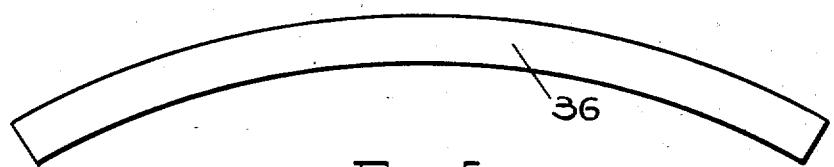

In the drawings which illustrate preferred embodiments of my invention, Fig. 1 is a cross section and partial elevation of a portion of a finished tire vulcanized to a metal base band and provided with an interior circumferentially continuous cavity, the thread being shown downward, as in ground contact; Fig. 2 is a similar section and partial elevation of the portion of the tire of Fig. 1 prior to the removal of the core therefrom; Fig. 3 is a perspective view of a portion of the core of Fig. 2, illustrating how the core is made in sections and bound together; Fig. 4 is a cross section and partial elevation of a mold for forming the core in sections by compressing the material thereof; Figs. 5 and 6 are plan views, on a reduced scale, of the lower and upper portions respectively of the mold of Fig. 4; Fig. 7 is a cross-section and partial elevation of a mold for forming the core in sections by fusing the material thereof; and Fig. 8 is a plan view of the mold of Fig. 7.

The tire shown in Fig. 1 is a cushion tire made of rubber or rubber compound and comprises a metal base band 11, of the well known standard S. A. E. such as is at present used almost universally for solid tires of the pressed-on type, on the outer circumference of which is mounted the rubber body of the tire comprising a tread portion 12, integrally uniting the two circumferentially continuous side members 13, separated by the cavity 14, and united to the harder base portion 16, which is vulcanized and mechanically joined to the outer circumference of the metal base band 11, by the usual dove tail corrugations 17 and flanges 18 thereof.

In order to obviate the necessity of splitting or slotting the metal base band 11, of the tire shown in Fig. 1, to permit the removal of the solid core after the tire has been vulcanized, I make the said core 19, of Fig. 2, of any suitable material or mixture of materials which is, or may be reinforced to be, sufficiently hard and strong to resist undue deformation or fracture while the rubber body of the tire is being formed and compressed in the mold, and at the same time the said material (or one or more of the materials which act to bind the mixture together if a mixture be used) is sufficiently soluble or easily softened by a fluid to enable the core to be readily disintegrated and removed through one or more orifices in the base by subjecting the said core to a fluid dissolving or disintegrating agent. The material which I prefer for this purpose, where a single material is used for the core, is common salt, since it is not only cheap but can be readily formed into cores readily reinforceable to be sufficiently hard and strong for the purpose, and at the same time is readily soluble in a cheap dissolving agent to which the rubber compound is chemically inert, such as water. In order, however, to enable the core to be readily dissolved, or disintegrated and removed by a fluid agent, it is advantageous to provide the core itself with a small annular passage or cavity 19' through which the dissolving or disintegrating agent may be circulated. This enables the said agent to readily carry away the material as rapidly as it is dissolved or disintegrated and thus simplifies and expedites the operation of removing the core. To enable the core to be thus removed I provide the metal base band 11 with one or more radially formed holes 20 through which the fluid agent may be introduced and it and the disintegrated core may run out, the said radial holes 20 being of any shape desired, either circular and preferably threaded as shown in Fig. 2, or oblong as shown in my above referred to pending application.

In forming the cores they may be molded as complete annular rings directly on to the metal base band in a manner similar to that described in my above referred to pending application, or they may be molded in sections, and the complete annular ring built up by assembling these sections on the base bands and securing them thereto and to each other However, in the use of a material that becomes brittle as these cores do when formed of salt, I prefer to mold them in sections and assemble the complete cores from these sections, and also to mount the cores on the base bands after the compound for the hard rubber base has been applied thereto, with a suitable thickness of the rubber compound or some other relatively soft material lying between the base of the cores and the metal band to form a somewhat yielding abutment for these cores to prevent them from being cracked when the metal base bands, which are frequently somewhat out of round, are pulled into a more circular form by the tire mold in the later operations.

I also prefer to make the sections of the core longitudinally divided into halves, as this enables me to not only stagger the joints in one-half of the core with the joints in the other half, thereby preventing any point in the circumference of the completed core from having a joint extending completely through it laterally, but at the same time, by thus dividing the core, I am able to readily mold a cavity inside of it which can be readily protected against plastic rubber being squeezed into it during the process of molding the rubber body of the tire around it, as it is desirable that this cavity be continuous either circumferentially through the core, or from one radial opening in the base to the next, so that the dissolving or disintegrating fluid can be readily circulated therethrough and dissolve or disintegrate the core and carry it out of the tire after it is vulcanized.

In accomplishing the above objects I prefer to use a mold for the sections of the core such as is shown in Figs. 4, 5 and 6, adapted to compressively mold a half section of the core of one sixth of the complete circumference in length. Twelve of these sections are therefore used in assembling a complete core. In assembling the complete core from these twelve sections with the joints staggered, as above described, the joints both longitudinally and laterally are tapered over as shown in Fig. 3 with a suitable fabric or other flexible material as hereinafter described to bind the sections together and to prevent the rubber compound from being squeezed into the joints when the body of rubber around the core is tightly squeezed and vulcanized in the mold in succeeding operations. Some or all of the sections of the core may be cemented or otherwise secured together and the joints filled, thus avoiding the use of the flexible reinforcing and covering material for the core, or the flexible material may be of such a nature or be so coated or treated as to prevent the rubber compound from sticking to it during the vulcanizing process. It is desirable, however that the joints be not too rigid where the core material is quite brittle. The mold shown in Figs. 4, 5 and 6 comprises a lower mold or die block 30 arcuate in shape in plan view and having formed in its upper face an arcuately extending recess or depression 31 which in cross-section is wider and deeper than the half-section of core to be formed in it, and also somewhat longer than the said core. The vertical face 32 of the inner arc of the arcuate depression is inclined slightly inward toward the depression at the bottom thereof as are also the end faces 33 and 34 of the said depression. Fitting into the depression and against the said inclined faces 32, 33 and 34 is a filler piece 35 having a vertical thickness the same as the depth of the depression at the point where it is located, and a width such that the remaining portion of the depression is of the lateral width and length to correspond with the radial height and length of the core section desired. The depth of the depression is purposely made greater than the thickness of the half section of core to be formed to allow for the proper degree of bulk compressibility of the material of which the core is formed. Where the material used is salt, the extra depth should be about 25%, since at a pressure of about thirty thousand pounds per square inch on the salt (such as I find it desirable to use) its volume is decreased about this amount. Since the core shown is tapered in thickness the extra depth is shown as correspondingly tapered. The upper mold or plunger block 36 is also arcuate in shape in plan view and of a width and length exactly corresponding with the portion of the depression in which the core is formed, so that substantially no material can squeeze past it and out of the lower block. The upper and lower faces of the upper block 36 are parallel and on the lower face is an arcuately extending semicircular ridge 37 for forming a correspondingly shaped depression on the midline face of the half section of core corresponding with half of the hole 19'. Suitable fastening plates such as 38 are secured by bolts 39 in tapped holes 40 to the lower block 30 to hold the filler piece 35 in place. This mold is placed in a suitable press, such as an hydraulic one of say a thousand tons capacity, and the lower die block 30 fastened to the lower compression producing member thereof. The upper block 36 is then fastened to the upper compression producing member of the press in accurate alinement with the depression in the lower block. The depression in the lower block, with the filler piece 35 in place, is then filled with the material for the core, the surplus being scraped off flush with the upper face of the block and preferably with a semi-circular depression in it corresponding with the ridge 37 on the upper block, as shown by the dotted line 37'. Where salt is used for the core the material should be almost completely devoid of moisture, the moisture content being preferably not more than one per cent. With this material and the above described mold, the core section becomes quite strong when compressed at about thirty thousand pounds per square inch. To enable the core to be readily removed from the lower die block, one or more holes such as 41 are provided for forcing out the tapered filler piece 35 while the upper die or plunger 36 is still on top of the core, after which the plunger may be raised and the core lifted out.

Where the core sections are formed by fusing and molding either the entire material of the core or fusing the portion thereof which binds the other material together when molded, I provide a mold such as that shown in Figs. 7 and 8. The upper face of the bottom plate 50 here forms the mid-line face of the half core section, the semi-circular arcuately extending ridge 51 corresponding with the ridge 37 of the upper die block or plunger 30. The recess or depression 55 for molding the body of the core section is formed in the lower face of the upper portion 52 of the mold. The two parts of the mold are separately located with respect to each other by the dowel pins 53 and corresponding holes. Formed in the upper face of the upper part 52 of the mold is a funnel shaped opening 54 extending through to the upper edge of the core forming cavity and also preferably extending arcuately for the full length of the said cavity to enable the material to be poured or forced in and the air to escape.

If desired, the compression mold of Figs. 4, 5 and 6 may be used for molding under pressure or otherwise the core sections where the material of the core is rendered coherent or moldable by fusing a part or all of it or by moistening a part or all of it. The important thing is to so vary the method of forming the core sections and joining them together to suit the material used as to produce cores that are sufficiently rigid in form and strong to resist undue deformation and fracture during the later molding and vulcanizing of the tire, and at the same time have the core material in such condition when these operations are completed that the said cores may be readily removed from the cavities in the tires through one or more apertures in the metal base by subjecting them to a fluid solvent or disintegrating agent.

Referring to Fig. 2 it will be noted that the threaded hole 20 in the base is closed by a plug 21 to prevent the compound from squeezing out and that the base of the core 19 is located in a circumferential groove 26 in the harder rubber compound 16, this groove 26 having been formed for the express purpose of definitely locating the core 19 in a predetermined position laterally with respect to the base band 11. If desired the harder rubber compound 16 may be omitted altogether for the width of this groove as indicated by the dotted lines 16' and its place taken by some other material, either metallic or nonmetallic, that is soft enough to yield sufficiently to prevent fracture of the more brittle core as heretofore referred to. Such a substitute material may be applied to the metal band either before the hard rubber compound 16 is applied or the proper space may be left for it and it may be applied afterward. Such substitute material may be chosen as has high thermal conductivity for the purpose of having it remain in the tire to collect and transmit the heat from the walls of the cavity to the metal base when the tire is in service on a vehicle wheel, or it may be chosen with a view to its removal after the tire is completed in order to let the said heat be collected and transmitted by the thereby exposed portion of the metal base band. Lead or an alloy thereof may be thus used.

Before mounting the core on the base in the above described locating groove 26, short strips of tape or other flexible material 23 are laid laterally across the said groove at the points where the lateral joints in the multiple section core will come. A strip of tape or other suitable material 25 of the width of the groove is then (or coincidently with the placing of the lateral strips 23 in position) pulled down tightly into the bottom of the said groove 26 and the ends joined to form a taut ring holding the lateral strips 23 in place. The sections of core are then mounted on and bound to the base strip 25, and thus to the base 11, by the lateral strips 23 being pulled radially outward tight against the core, the two ends of each strip being joined together or secured to the core with the lateral joints covered by them as shown in Figure 3. A wide nose section strip of tape or other flexible material 24 is then applied circumferentially in a taut condition and its ends secured thus completing the assembling and reinforcing of the core. The nose section strip of material 24 is preferably made of fabric cut on the bias so that it may be pulled down as an enveloping covering around the nose and tight against the sides of the core without folds or puckers. Other material formed as two or more overlapping strips may however be used in place of this single nose piece 24 or it may be omitted altogether by cementing the half core sections together in staggered relation, but where the material of the core is quite brittle it is advantageous to cover and reinforce a large portion or all of the exterior surface of the core with a flexible reinforcing material. After the core has been assembled on the base band 11 as above described, the rubber compound for the body of the tire is then applied in the usual manner to the base and around the core to the proper amount and the tire is then subjected to the usual further operations of forming and vulcanizing it in a suitable mold as described in my above referred to pending application.

After the tire has been vulcanized and removed from the mold the apertures 20 in the base are opened by removing the plugs 21 therefrom. By means of a drill, or other suitable instrument, the apertures 20 are extended up into the core 19 till they are in communication with the longitudinally extending hole 19′ in the core, a fluid agent capable of disintegrating the core at a temperature below that of vulcanization of the rubber is then introduced through the apertures 20 and the core thus disintegrated and removed with the fluid from the cavity of the tire.

A suitable mixture of materials for forming the core sections consists of sand the particles of which have been coated with salt and compressed into a rigid mass under heavy pressure. Where the sand particles or grains are rather large such a core may be quickly disintegrated by circulating water through the hollow of the core, as the water has to dissolve only the small quantity of salt used as the binding agent in order to disintegrate and remove the core.

Claims:

1. In a process for making cored articles of vulcanized rubber compound, the use of a hollow annular core formed out of fragile granular material into substantially rigid arcuate sectors flexibly joined by means covering the joints in the core assembled from such sectors to prevent rubber compound from being squeezed into the joints and hollows of the core.

2. In a process for making cored articles of vulcanized rubber compound, the use of a hollow annular core formed out of disintegrable material into substantially rigid arcuate sectors flexibly joined by means covering the joints in the core assembled from such sectors to prevent rubber compound from being squeezed into the joints and hollows of the core.

3. In a process for making rubber tires provided with an internal annular cored cavity with the rubber body of the tire vulcanized to a metallic base band, the mounting of a sectionally divided cavity forming core with its inner peripheral surface resting on a layer of softer material and secured thereon by strips of flexible material binding the sections of the core together.

4. In a process for making cored tires of rubber compound fixedly vulcanized to an undivided metallic base band containing a hole, the applying of a layer of rubber compound to the outer peripheral surface of the base band with a laterally positioned locating groove in the said layer of compound, mounting a sectionally divided core in the said locating groove and securing the said sections together and to the said base band, the molding and vulcanizing of the tire body around the said core, the perforating of said layer of rubber compound in line with the hole in the base band, and the removal of the said core through aligned holes in said layer of rubber compound and the base band.

5. In a process for making cored tires, the method of securing a sectional annular core about the periphery of a ring, which comprises laying strips of tape across the outer periphery of the ring, forming a circumferential band of tape about the ring over the middle portions of said strips of tape, placing the core sections on said band of tape, and drawing the free ends of said strips of tape over the core sections and securing them together.

6. In a process for making cored tires of rubber compound fixedly vulcanized to an undivided but apertured metallic base band, the mounting about said base band of a hollow annular core consisting of arcuate sectors composed of material held in a coherent mass by a soluble binder, the molding and vulcanizing of the tire body about said core, the introduction of a solvent for the binder into the hollow of the core, and the removal of the core and solvent through the apertured base band.

7. In a process for making cored tires of rubber compound fixedly vulcanized to an undivided metallic base band containing a hole, the mounting about the base band of a hollow annular core consisting of disintegrable arcuate sectors, the molding and vulcanizing of the tire body about said core, the forming of a passage from the hole in the base band into the hollow of the core, the introduction of a fluid into the hollow of the core through said passage, and the removal of the core and fluid.

8. Apparatus for making cored cushion tires, fixedly vulcanized to an undivided metallic base band, comprising a series of half sectors assembled about the base band to form an arcuate core, and flexible means for securing said half sectors together and to the base band.

9. In a process for making cored tires of rubber compound fixedly vulcanized to an undivided metallic base band containing a hole, the mounting of a series of half sectors about said base band to form an annular core, and the securing of said half sectors together and to the base band by flexible means.

10. In a process for making cored tires of rubber compound fixedly vulcanized to an undivided metallic base band, the use of an annular core consisting of half sectors, each having at one side a molding surface and at the other side a flat surface fitting the corresponding surface of another half sector, said flat surfaces containing circumferentially aligned grooves to provide a continuous longitudinal cavity in the assembled core.

11. In a process for making cored tires of rubber compound fixedly vulcanized to an undivided metallic base band, the mounting about the base band of separate rigid core pieces forming an annular core and enclosing a free space within the core, molding and vulcanizing the tire body around said core, and utilizing said free space in the removal of the core.

In testimony whereof, I have signed my name to this specification this 29th day of August, 1923.

CHARLES M. MANLY.

CERTIFICATE OF CORRECTION.

Patent No. 1,762,723.                           Granted June 10, 1930, to

CHARLES M. MANLY.

It is hereby certified that error appears in the printed specification of the above numbered patent requiring correction as follows: Page 1, line 41, for the word "thread" read tread; page 2, line 74, for "tapered" read taped; and that the said Letters Patent should be read with these corrections therein that the same may conform to the record of the case in the Patent Office.

Signed and sealed this 21st day of October, A. D. 1930.

(Seal)

M. J. Moore,
Acting Commissioner of Patents.

tion of a fluid into the hollow of the core through said passage, and the removal of the core and fluid.

8. Apparatus for making cored cushion tires, fixedly vulcanized to an undivided metallic base band, comprising a series of half sectors assembled about the base band to form an arcuate core, and flexible means for securing said half sectors together and to the base band.

9. In a process for making cored tires of rubber compound fixedly vulcanized to an undivided metallic base band containing a hole, the mounting of a series of half sectors about said base band to form an annular core, and the securing of said half sectors together and to the base band by flexible means.

10. In a process for making cored tires of rubber compound fixedly vulcanized to an undivided metallic base band, the use of an annular core consisting of half sectors, each having at one side a molding surface and at the other side a flat surface fitting the corresponding surface of another half sector, said flat surfaces containing circumferentially aligned grooves to provide a continuous longitudinal cavity in the assembled core.

11. In a process for making cored tires of rubber compound fixedly vulcanized to an undivided metallic base band, the mounting about the base band of separate rigid core pieces forming an annular core and enclosing a free space within the core, molding and vulcanizing the tire body around said core, and utilizing said free space in the removal of the core.

In testimony whereof, I have signed my name to this specification this 29th day of August, 1923.

CHARLES M. MANLY.

CERTIFICATE OF CORRECTION.

Patent No. 1,762,723. Granted June 10, 1930, to

CHARLES M. MANLY.

It is hereby certified that error appears in the printed specification of the above numbered patent requiring correction as follows: Page 1, line 41, for the word "thread" read tread; page 2, line 74, for "tapered" read taped; and that the said Letters Patent should be read with these corrections therein that the same may conform to the record of the case in the Patent Office.

Signed and sealed this 21st day of October, A. D. 1930.

(Seal)

M. J. Moore,
Acting Commissioner of Patents.